US012798902B2

(12) United States Patent
Frey

(10) Patent No.: US 12,798,902 B2
(45) Date of Patent: Nov. 17, 2026

(54) DEVICE FOR HANDLING OBJECTS, HANDLING SYSTEM, METHOD FOR HANDLING OBJECTS

(71) Applicant: J.Schmalz GmbH, Glatten (DE)

(72) Inventor: Matthias Frey, Sulz-Dürrenmettstetten (DE)

(73) Assignee: J. SCHMALZ GMBH, Glatten (DE)

( * ) Notice: Subject to any disclaimer, the term of this patent is extended or adjusted under 35 U.S.C. 154(b) by 174 days.

(21) Appl. No.: 18/785,266

(22) Filed: Jul. 26, 2024

(65) Prior Publication Data

US 2025/0033903 A1 Jan. 30, 2025

(30) Foreign Application Priority Data

Jul. 28, 2023 (DE) ..................... 10 2023 120 132.8

(51) Int. Cl.
*B65G 47/91* (2006.01)

(52) U.S. Cl.
CPC .................................. *B65G 47/914* (2013.01)

(58) Field of Classification Search
CPC .................................................... B65G 47/914
See application file for complete search history.

(56) References Cited

U.S. PATENT DOCUMENTS 5,015,145 A 5/1991 Angell et al.
9,701,492 B2 7/2017 Criswell
2009/0074546 A1 * 3/2009 Christensen ......... B65G 41/008 198/803.16
2015/0336378 A1 11/2015 Guttmann et al.
2016/0221187 A1 8/2016 Bradski et al.
2017/0190054 A1 7/2017 McCollum et al.
(Continued)

FOREIGN PATENT DOCUMENTS

CN 115070805 A 9/2022
DE 3714291 A1 12/1988
(Continued)

OTHER PUBLICATIONS

European Search Report and Opinion, EP 24182387, Oct. 28, 2024 (9 pages).

(Continued)

*Primary Examiner* — Gerald McClain
(74) *Attorney, Agent, or Firm* — William J. Barber; WARE FRESSOLA MAGUIRE & BARBER LLP

(57) ABSTRACT

A device for handling objects, including cardboard boxes, features a conveyor apparatus having a continuous conveyor with a circulating conveyor element driven by a drive unit in a running direction; and a gripping apparatus having a gripping unit to grip an object and arrange the object gripped on the continuous conveyor. The gripping unit is forced coupled to, and moves along, the circulating conveyor element in the running direction. The gripping apparatus has a further gripping unit, and the gripping unit and the further gripping unit are arranged one behind the other in the running direction. The gripping unit includes a first part having gripping elements of the gripping unit arranged thereon, and a second part that couples the first part to the circulating conveyor element. The first part being mounted on the second part to pivot, including about a pivot axis perpendicular to the running direction.

20 Claims, 5 Drawing Sheets

(56) References Cited

U.S. PATENT DOCUMENTS

| | | | | |
|---|---|---|---|---|
| 2021/0386037 | A1* | 12/2021 | Robert | B25J 15/0625 |
| 2024/0391693 | A1* | 11/2024 | Hogan | B65G 47/917 |
| 2025/0019181 | A1* | 1/2025 | Woller | B65G 47/914 |

FOREIGN PATENT DOCUMENTS

| | | | | |
|---|---|---|---|---|
| DE | 102005007472 | A1 | 8/2006 | |
| DE | 102007054867 | A1 | 5/2009 | |
| DE | 102010033115 | A1 | 2/2012 | |
| DE | 102011115951 | B4 | 3/2016 | |
| EP | 2134629 | B1 | 12/2009 | |
| EP | 2384864 | A1 | 4/2011 | |
| EP | 3020515 | A1 | 5/2016 | |
| EP | 3623114 | A1 | 3/2020 | |
| EP | 4011570 | A1 | 6/2022 | |
| EP | 4151557 | A1 | 3/2023 | |
| WO | 2016054656 | A1 | 4/2016 | |
| WO | WO-2021148201 | A1 * | 7/2021 | B65G 59/04 |

OTHER PUBLICATIONS

Examination Report of German Patent Application 10 2023 120 132.8, Apr. 4, 2024.

* cited by examiner

DEVICE FOR HANDLING OBJECTS, HANDLING SYSTEM, METHOD FOR HANDLING OBJECTS

FIELD OF THE DISCLOSURE

The present invention relates to a device for handling objects, comprising a conveyor apparatus having at least one continuous conveyor, and comprising a gripping apparatus comprising at least one gripping unit. Furthermore, the present invention relates to a handling system comprising such a device and a handling apparatus for handling the device. Furthermore, the present invention relates to a method for handling objects by means of such a device or such a handling system.

BACKGROUND OF THE DISCLOSURE

In logistics, a large number of objects such as cardboard boxes typically have to be handled. It is known to use devices which comprise a gripping apparatus and a conveyor apparatus for handling objects. Such devices are used, for example, when unloading (e.g. stacked) containers or trucks. The gripping apparatus comprises at least one gripping unit which is designed to grip at least one object. The conveyor apparatus often comprises a continuous conveyor which comprises at least one circulating conveyor element. The conveyor element can be driven by a drive unit in at least one running direction. An object gripped by the gripping unit can be arranged on the continuous conveyor. The object arranged on the continuous conveyor can then be transported away by the continuous conveyor. For example, the object is fed to a further continuous conveyor arranged downstream of the continuous conveyor.

In known devices, the gripping unit is typically fastened to a robot arm arranged adjacently to the continuous conveyor. Such devices are known, for example, from U.S. Pat. No. 9,701,492 B2, WO 2016/054656 A1, US 2017/0190054 A1, DE 10 2010 033 115 A1, U.S. Pat. No. 5,015,145 and US 2016/0221187 A1. The devices have a comparatively low throughput and are therefore inefficient. This is particularly due to the fact that the robot arm must move the gripping unit together with a gripped object to the continuous conveyor in order to arrange the object on the continuous conveyor. The correct arrangement of the object on the continuous conveyor in particular can sometimes be time-consuming. The gripped object must then be released from the gripping unit. Only then can the robot arm carry out another handling operation by means of the gripping unit.

SUMMARY OF THE DISCLOSURE

The object of the invention is to improve the efficiency of a device for handling objects with regard to carrying out handling operations.

This object is achieved according to the invention by a device having the features of claim 1, by a handling system having the features of claim 10 and by a method having the features of claim 11. The dependent claims and the description indicate advantageous variants and embodiments.

According to the invention, a device for handling objects is provided. In particular, the objects are cardboard boxes, crates, cases or boxes. However, the device can also be used to handle objects that deviate therefrom.

The device comprises a conveyor apparatus which comprises at least one continuous conveyor. The continuous conveyor comprises at least one circulating conveyor element which can be driven by a drive unit in at least one running direction. A circulating conveyor element is a conveyor element that is closed in the running direction. If a circulating conveyor element is driven in one running direction, each point on the conveyor element returns to its corresponding starting position at a certain point in time, depending on the length of the conveyor element and the running speed. In particular, the conveyor element is guided around one or more return rollers of the continuous conveyor. Said return rollers are preferably rotatably mounted on a main body of the continuous conveyor. The drive unit can be designed to rotate one or more of the return rollers. The rotation of the return rollers then drives the conveyor element in the running direction. The conveyor element can also be drivable in the running direction and in another running direction counter to the running direction.

The device also comprises a gripping apparatus which comprises at least one gripping unit. The gripping unit is designed to grip at least one object and to arrange the gripped object in the operating range of the continuous conveyor, in particular to arrange it on the circulating conveyor element of the continuous conveyor. Depending on the design of the gripping unit, the gripping unit can grip the object in different ways each time, as explained in more detail below. The gripping unit can also be designed to grip several objects simultaneously.

It is now provided that the gripping unit is coupled to the conveyor element in such a way that it is moved along with the conveyor element in the running direction.

By coupling the gripping unit to the conveyor element, the efficiency of handling operations can be increased. If the conveyor element is driven so as to move in the running direction after an object has been gripped by the gripping unit, the gripping unit together with the gripped object is inevitably moved along with the conveyor element. Through this movement, the gripped object is pulled onto the continuous conveyor and thereby arranged on the continuous conveyor. In this respect, the arrangement of the object on the continuous conveyor results directly from the conveyor element being driven and the coupling, in particular the forced coupling, between the gripping unit and the conveyor element. Positioning by means of a robot arm or the like is not necessary. The object arranged on the continuous conveyor can then be released from the gripping unit and transported further. For example, the released object is fed to a further continuous conveyor arranged downstream of the continuous conveyor.

Preferably, the gripping unit comprises a plurality of gripping elements and is designed to grip the object by means of the plurality of gripping elements. However, the gripping unit may also comprise just one gripping element and may be designed to grip the object by means of the single gripping element.

Preferably, the continuous conveyor is designed as a belt conveyor. Such a design of the continuous conveyor is preferred because a belt conveyor is particularly suitable for the safe transport of objects such as cardboard boxes. However, the continuous conveyor can also be designed as a chain conveyor or circular conveyor.

Preferably, the gripping unit is designed as a suction gripper. A suction gripper is designed to grip an object by generating a negative pressure. For this purpose, the gripping element or gripping elements of a suction gripper is/are designed as suction elements. The gripping element or gripping elements is/are assigned a negative pressure-generating unit designed to generate a negative pressure between the gripping element or gripping elements and an object to be gripped. The ambient pressure then presses the gripping element or gripping elements against the object, thereby applying the required holding force and gripping the object. One advantage of a gripping unit designed as a suction gripper is that a gripped object can be easily released, namely by ventilating the volume in which the negative pressure is created. However, the gripping unit can also be designed as a clamping gripper or as an adhesion gripper. A clamping gripper comprises a plurality of gripping elements that can be moved relative to one another in such a way that the object can be clamped between the gripping elements. By clamping the object between the gripping elements, the required holding force is applied and the object is gripped. An adhesion gripper is designed to grip objects using adhesion forces, in particular Van der Waals forces. For this purpose, the gripping element or gripping elements of an adhesion gripper are designed with an adhesive structure.

In some preferred embodiments, the gripping unit comprises a first part and a second part, wherein one or more gripping elements of the gripping unit is/are arranged on the first part, wherein the first part is coupled to the conveyor element by the second part, and wherein the first part is pivotally mounted on the second part. Such a design of the gripping unit offers advantages with regard to the arrangement of the gripping unit on the object to be gripped. By pivoting the first part, the gripping unit can be oriented relative to the object as desired. In addition, the design also offers advantages with regard to the arrangement of a gripped object on the continuous conveyor. Specifically, the first part can, for example, be pivoted counter to the running direction of the conveyor element so that the object is arranged on the continuous conveyor behind the gripping unit in the running direction. Particularly preferably, the first part is mounted on the second part so as to be pivotable about a pivot axis that is perpendicular to the running direction. Preferably, the first part is assigned an actuator which is designed to pivot the first part relative to the second part.

Preferably, the gripping unit is designed in two parts. This means that in addition to the first part and the second part, there is no other part that is pivotally mounted on the first part or on the second part.

In some preferred embodiments, it is provided that a free end of the gripping unit, which is spaced apart from the conveyor element, is formed by the gripping element or by the gripping elements. Such an arrangement of the gripping element or elements is preferable because it makes it easier for the gripping element or elements to make contact with the objects to be gripped. If the gripping unit is designed to be elongated, the free end is a free longitudinal end of the gripping unit. If the gripping unit is designed as a suction gripper, the free end of the gripping unit is preferably formed by a circumferential sealing lip of a suction element of the suction gripper or by circumferential sealing lips of suction elements of the suction gripper.

The holding plane of the gripping unit is defined by the gripping element or by the gripping elements together. The holding plane of the gripping unit is the plane in which the gripping unit comes into contact with the object to be gripped during a gripping process. Preferably, the gripping element or the gripping elements are arranged in such a way that the holding plane is aligned perpendicular to the extension of the gripping unit from the conveyor element to the free end when the gripping unit is stretched, i.e. when the first part and the second part are not angled toward each other.

In some preferred embodiments, the gripping unit is arranged in the center of the continuous conveyor with respect to a transverse extension of the continuous conveyor. The transverse extension of the continuous conveyor is perpendicular to the running direction of the conveyor element. If the gripping unit is arranged centrally, an object gripped by the gripping unit is pulled onto the continuous conveyor in a particularly secure manner by moving the gripping unit in the running direction.

In some preferred embodiments, the gripping apparatus comprises at least one further gripping unit, wherein the gripping unit and the further gripping unit are arranged one behind the other in the running direction. By providing a further gripping unit, the efficiency of the device with regard to carrying out handling operations can be further increased. If, for example, there are two gripping units arranged one behind the other in the running direction, one handling operation can be carried out by each of the gripping units during a complete revolution of the conveyor element.

In some preferred embodiments, the continuous conveyor comprises at least one further circulating conveyor element, wherein the conveyor element and the further conveyor element are arranged next to one another, and wherein a distance between the conveyor element and the further conveyor element is adjustable. Such a design can increase the flexibility of the device. If, for example, small objects are to be handled by means of the device, a small distance is set between the conveyor elements. However, if larger objects are to be handled, a larger distance between the conveyor elements is also set. In addition, by providing two conveyor elements, a space is created between the conveyor elements which is particularly suitable for the arrangement of the gripping element or gripping elements. Preferably, the gripping element is arranged between the conveyor elements. In particular, the conveyor elements can be driven in the running direction by the same drive unit. However, each conveyor element can also be assigned its own drive unit.

In some preferred embodiments, the device comprises at least one imaging sensor unit which is designed to detect objects to be gripped. By means of such a sensor unit, a visual inspection can be carried out for a user of the device, facilitating the arrangement of the gripping unit on the object to be gripped, as desired. Preferably, the sensor unit is designed as a camera sensor.

Preferably, the device comprises at least one connection structure, in particular a connection flange, for fastening the device to a handling apparatus. By fastening said device to the handling apparatus, the flexibility with regard to carrying out handling operations can be increased. For example, the handling device can move the device fastened thereto in the vertical direction or change an angle of inclination of the device. Preferably, the connection structure is fastened to the aforementioned main body of the continuous conveyor or is formed integrally with the main body.

The handling system according to the invention comprises a device designed as described above and a handling apparatus for handling the device. Preferably, the device, in particular the continuous conveyor, is detachably fastened to the handling apparatus.

With regard to the advantages achievable by means of the handling system, reference shall be made to the statements made in this regard in relation to the device and the method. The features described in connection with the device or the method can serve for further developing the handling system.

The method according to the invention for handling objects by means of a device designed as described above or a handling system designed as described above comprises at least the following:

Gripping at least one object, in particular a cardboard box, using the gripping unit. Preferably, the object is gripped by generating a negative pressure between the object and one or more gripping elements of the gripping unit.

Driving the conveyor element in the running direction using the drive unit, whereby the gripping unit also moves in the running direction by forced coupling with the conveyor element and the gripped object is arranged on the continuous conveyor. Preferably, the gripped object is released from the gripping unit after being arranged on the continuous conveyor. The object can then continue to be handled independently of the gripping unit. Depending on the design of the gripping unit, the gripped object can be released in different ways each time. If the gripping unit is designed as a suction gripper, for example, the object is preferably released from the gripping unit by ventilating the volume in which the negative pressure is created.

Advantages and possible developments of the device are to be understood as also being described in relation to the method, and vice versa, advantages and possible developments of the method are to be understood as also being described in relation to the device.

In some preferred embodiments of the method, the gripping unit grips the object in a vertically lower region of the object with respect to a vertical extension of the object. If the gripping unit grips the object in the lower vertical region, the object is then pulled onto the continuous conveyor in a particularly secure manner. For example, if the gripping unit were to grip the object in a vertically upper region, the lower region could get stuck on a front end of the continuous conveyor when attempting to pull said object onto the continuous conveyor. This could cause the object to be released from the gripping unit and fall to the ground. Particularly preferably, the gripping unit grips the object adjacently to a vertically lower edge of the object.

In some preferred embodiments of the method, an angle of inclination of the continuous conveyor is changed in order to grip the object. By changing the angle of inclination, the position of the gripping unit in the vertical direction can be adjusted to the position of the object to be gripped.

In some preferred embodiments of the method, the first part of the gripping unit is pivoted relative to the second part in order to grip the object. Preferably, the first part is pivoted relative to the second part about the pivot axis that is perpendicular to the running direction. In certain situations, a holding plane of the gripping unit may initially be at an angle to a surface of the object to be gripped. This can occur, for example, if the angle of inclination of the continuous conveyor is changed or if the surface to be gripped is not vertical but is at an angle to a vertical axis. By pivoting the first part of the gripping unit, the orientation of the gripping unit can be adjusted to the orientation of the surface of the object to be gripped so that the object can be gripped securely. Preferably, the first part is already pivoted relative to the second part before the object is contacted by the gripping unit. This allows the first part, in particular the gripping element or elements, to be aligned with the object. The pivoting movement is preferably effected by an actuator assigned to the first part.

In some preferred embodiments, it is provided that the first part is pivoted relative to the second part after gripping the object in order to arrange the gripped object on the continuous conveyor. Preferably, the first part is pivoted relative to the second part in such a way that the gripped object is arranged on the continuous conveyor behind the gripping unit in the running direction.

BRIEF DESCRIPTION OF THE FIGURES

The invention is described in more detail below with reference to the figures, the same or functionally equivalent elements possibly being provided with reference signs only once. The description serves as an example and is not to be understood as limiting. In the figures.

DETAILED DESCRIPTION OF THE FIGURES

Figure 1A:
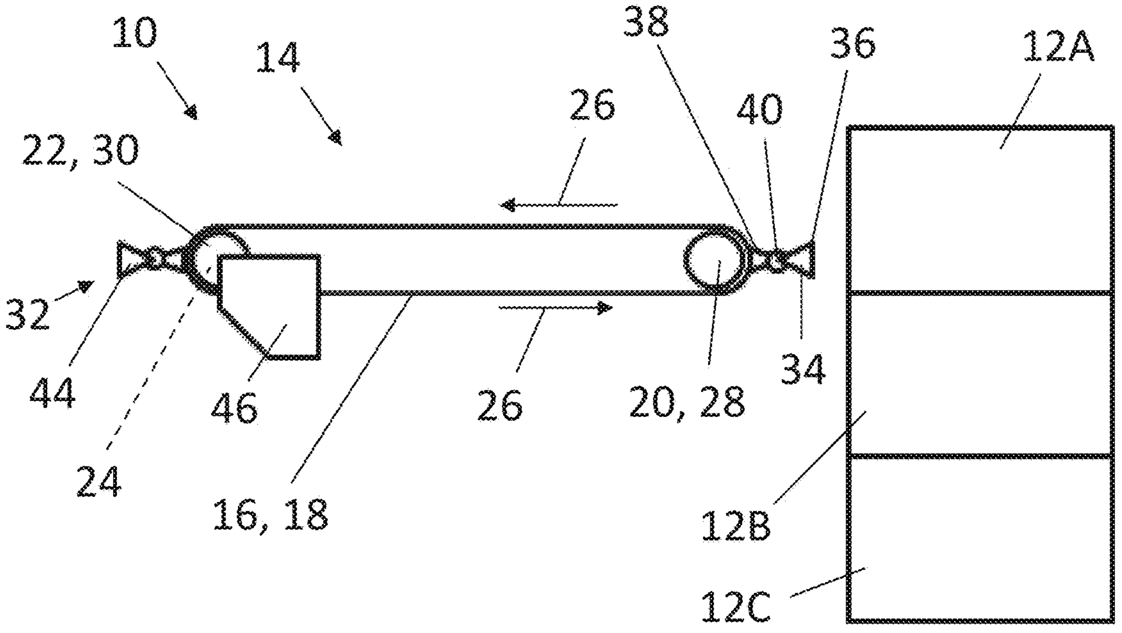
FIG. 1A to 1I show a device for handling objects at different points in time during an unloading process.

FIG. 1A to 1I show a side view of a device 10 for handling objects 12. In the present case, the objects 12 are cardboard boxes 12 which are stored stacked on top of one another in a container or the like. The drawings show the device 10 at successive points in time during an unloading process. During the unloading process described in more detail below, three objects 12A, 12B and 12C, which are initially stacked on top of one another, are handled or unloaded by means of the device 10. It should be noted that the device 10 is shown only schematically in the drawings.

The design of the device 10 shall first be explained in more detail with reference to FIG. 1A.

The device 10 comprises a conveyor apparatus 14 comprising a continuous conveyor 16. The continuous conveyor 16 comprises a circulating conveyor element 18. In the embodiment shown, the continuous conveyor 16 is designed as a belt conveyor 16. The conveyor element 18 is a conveyor belt 18. The continuous conveyor 16 also comprises a rotatably mounted first return roller 20 and a rotatably mounted second return roller 22. The conveyor element 18 is guided around the return rollers 20 and 22. In the present case, the return rollers 20 and 22 form a front end 28 and a rear end 30 of the continuous conveyor 16.

The continuous conveyor 16 also comprises a drive unit 24 which is designed to drive the conveyor element 18 in a running direction 26. In the present case, the drive unit 24 is integrated into the rear return roller 22, which is indicated by dashed lines in FIG. 1A. Accordingly, the rear return roller 22 is designed as a drive roller.

In the present case, the continuous conveyor 16 comprises, in addition to the conveyor element 18, a further conveyor element which is arranged adjacently to the conveyor element 18 and is therefore concealed by the conveyor element 18 in the drawings. The further conveyor element can be driven by the drive unit 24. However, the further conveyor element can also be assigned its own drive unit, for example a drive roller independent of the conveyor element 18.

The device 10 further comprises a gripping apparatus 32. The gripping apparatus 32 comprises a gripping unit 34. The gripping unit 34 is designed to grip at least one object 12. The gripping unit 34 can also be designed to grip a plurality of objects 12 simultaneously. In the present case, the gripping unit 34 is designed as a suction gripper 34. In this respect, the gripping unit 34 comprises one or more gripping elements (not visible in the drawings), which are designed as suction elements. A free end of the gripping unit 34, which is spaced apart from the conveyor element 18, is formed by the gripping element or by the gripping elements, in particular by a circumferential sealing lip of the suction element or by circumferential sealing lips of the suction elements.

The gripping unit 34 is mechanically coupled to the conveyor element 18 in such a way that it is moved along with the conveyor element 18 in the running direction 26 when the conveyor element 18 is driven in the running direction 26 with the conveyor element 18.

In the present case, the gripping unit 34 comprises a first part 36 and a second part 38. The gripping element or gripping elements is/are arranged on the first part 36. The first part 36 is coupled to the conveyor element 18 by the second part 38. For example, the second part 38 is fastened to the conveyor element 18. The first part 36 is connected to the second part 38 by a pivot joint 40. In the present case, the pivot joint 40 is designed such that the first part 36 can pivot about a pivot axis that is perpendicular to the running direction 26. The gripping unit 34 comprises an actuator designed to pivot the first part 36 relative to the second part 38 about the pivot axis. In the present case, the actuator is integrated into the pivot joint 40 and is therefore not visible.

In FIG. 1A, the gripping unit 34 is stretched. With such an orientation of the first part 36 and the second part 38 relative to one another, the holding plane of the gripping unit 34 is aligned perpendicular to the extension of the gripping unit 34 from the conveyor element 18 to the free end of the gripping unit 34.

As previously mentioned, the continuous conveyor 16 comprises in the present case a further conveyor element in addition to the conveyor element 18. The gripping unit 34 is arranged in the center of the continuous conveyor 16 with respect to the transverse extension of the continuous conveyor 16, i.e. in a space between the conveyor element 18 and the further conveyor element.

Preferably, the distance between the conveyor element 18 and the further conveyor element is variable. This is advantageous in that the transverse extension of the continuous conveyor 16 can be adjusted to the size of the objects 12 to be gripped.

In the embodiment shown in the drawings, the gripping apparatus 32 comprises a further gripping unit 44 in addition to the gripping unit 34. With regard to the design of the further gripping unit 44, reference shall be made to the above statements regarding the gripping unit 34. The gripping unit 34 and the further gripping unit 44 are arranged one behind the other in the running direction 26. During a complete revolution of the conveyor element 18, an object 12 can be gripped and unloaded each time by each of the gripping units 34 and 44, as will be explained in more detail below.

The device 10 also comprises a connection structure 46, which in the present case is designed as a connection flange 46. The connection structure 46 is fastened to a main body of the continuous conveyor 16, for example, on which the return rollers 20 and 22 are rotatably mounted. The device 10 can be connected to a handling apparatus (not shown in the drawings) designed to handle the device 10 by means of the connection structure 46. In the present case, the device 10 comprises a further connection element which is arranged on the other side of the continuous conveyor 16. In the side view shown, the additional connection element is concealed by the connection element 46 and is therefore not visible.

In the following, the sequence of the unloading process by means of the device 10 shall be explained in more detail with additional reference to FIG. 1B to 1I.

Figure 1B:
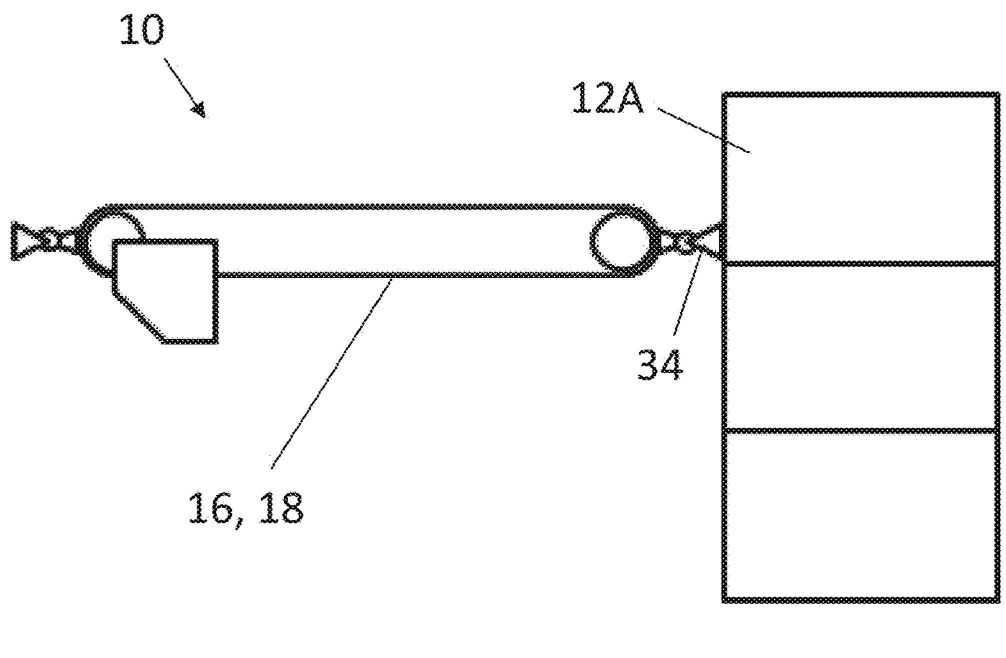

As can be seen from FIG. 1B, the gripping unit 34 is first arranged on a vertically lower region of the object 12A. In the present case, the gripping unit 34 is arranged on the object 12A immediately adjacently to a vertically lower edge of the object 12A. A negative pressure is then generated between the object 12A and the gripping element or gripping elements of the gripping unit 34, as a result of which the object 12A is gripped by the gripping unit 34. The conveyor element 18 preferably remains stationary as the object 12 is being gripped.

Figure 1C:
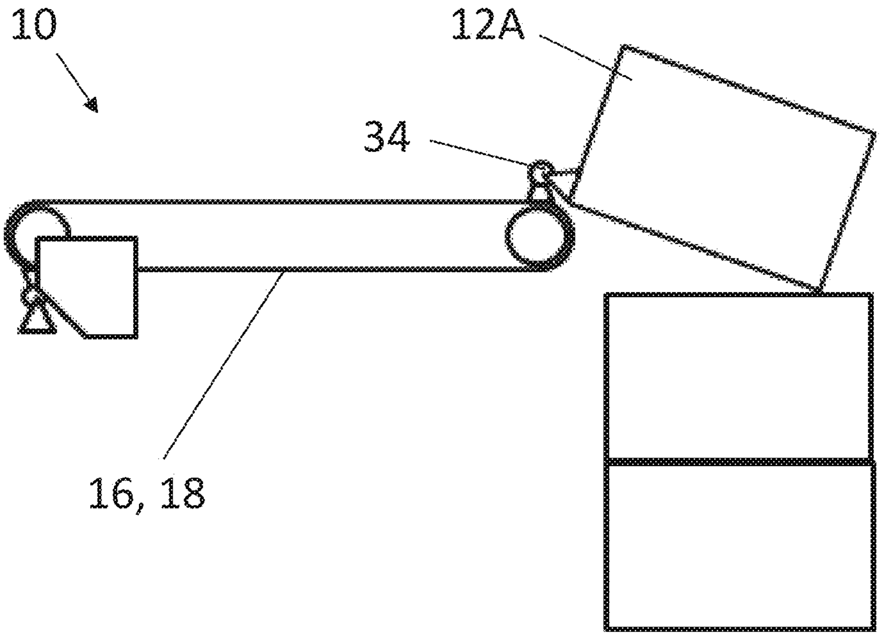
Figure 1D:
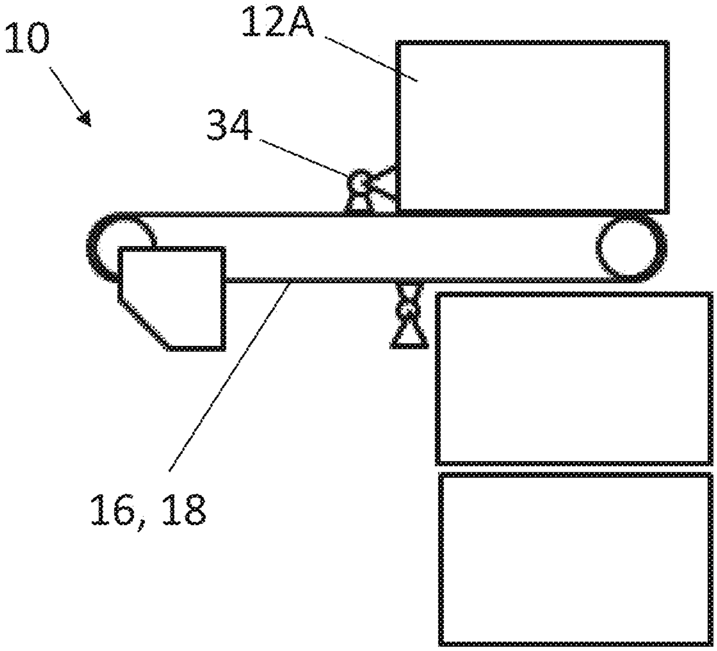
Figure 1E:
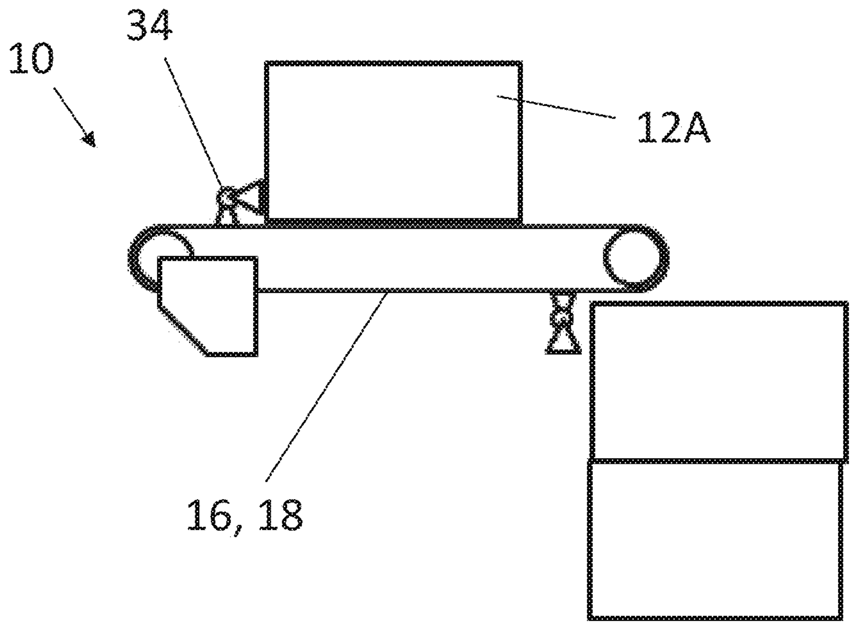

As can be seen from FIG. 1C to 1E, the conveyor element 18 is then driven by the drive unit 24 in the running direction 26. The gripping unit 34 together with the gripped object 12A is moved by forced coupling with the conveyor element 18, as a result of which the gripped object 12A is pulled onto the continuous conveyor 16 and is thus arranged on the continuous conveyor 16. The first part 36 of the gripping unit 34 is pivoted about the pivot axis counter to the running direction 26 so that the object 12A is arranged behind the gripping unit 34 in the running direction 26. Since the gripping unit 34 grips the object 12A in its vertically lower region, the object 12A is not blocked from being pulled onto the continuous conveyor 16 by the vertically lower edge of the object 12A.

Subsequently, the gripped object 12A is released from the gripping unit 34, as can be seen from FIG. 1F. In the case of the gripping unit 34 designed as a suction gripper 34, the space between the gripping element or gripping elements and the object 12A is ventilated for this purpose. The released object 12A can then be handled independently of the gripping unit 34. For example, the released object 12A is fed to a further continuous conveyor (not shown) arranged behind the continuous conveyor 16.

Figure 1F:
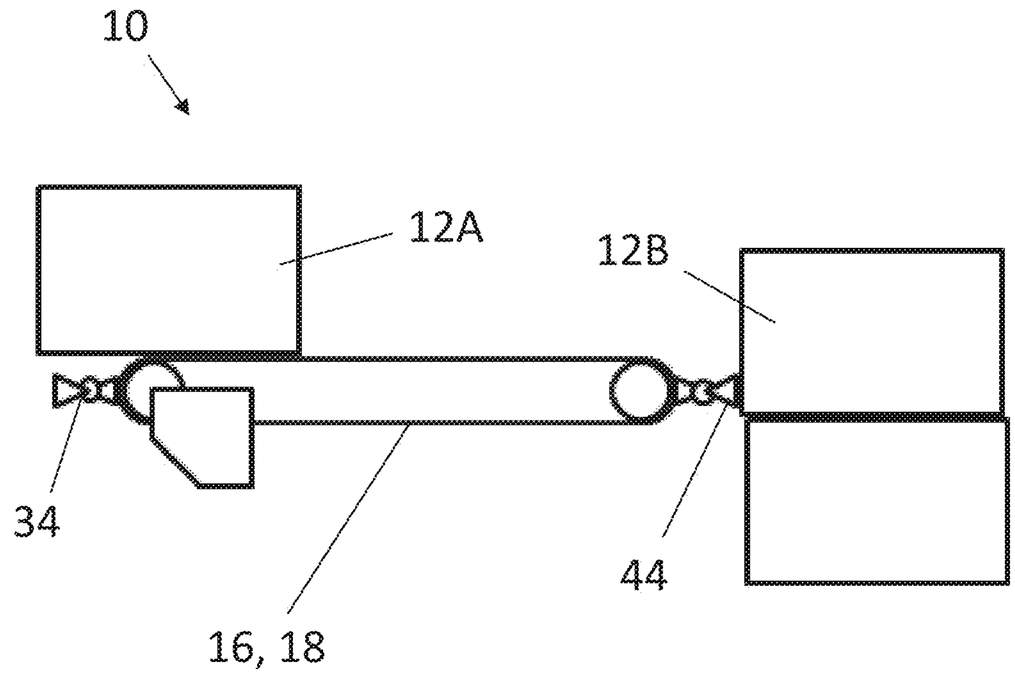

It can also be seen from FIG. 1F that a subsequent handling operation is carried out by means of the further gripping unit 44. The object 12B now to be gripped is arranged in a vertically lower position than the previously gripped object 12A. In order to grip the object 12B, the device 10 is moved vertically downward by the handling apparatus, whereby the angle of inclination of the device 10 remains constant.

Figure 1G:
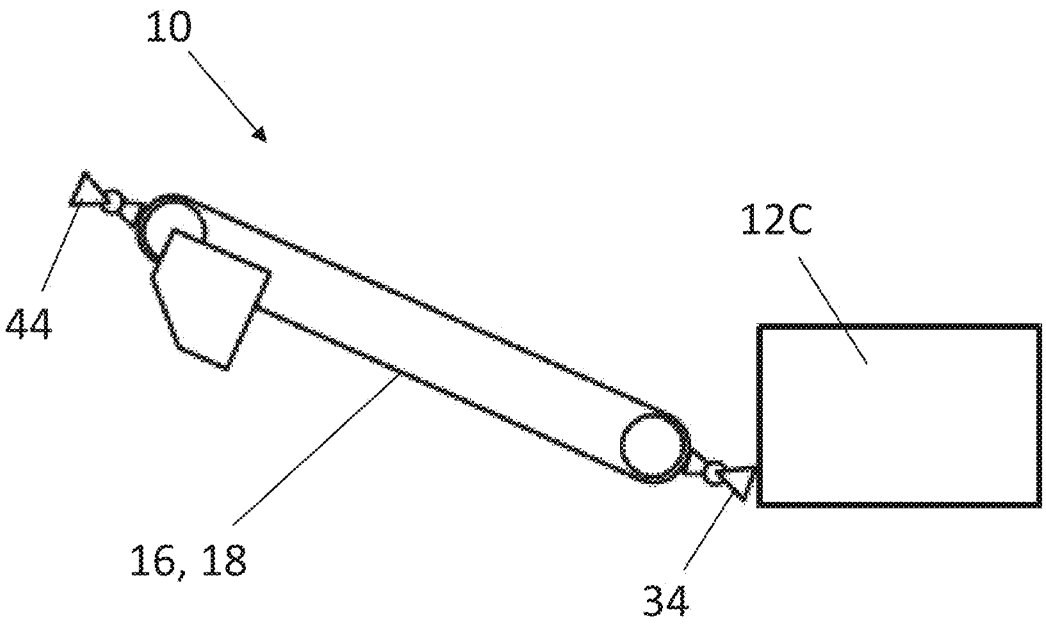
Figure 1H:
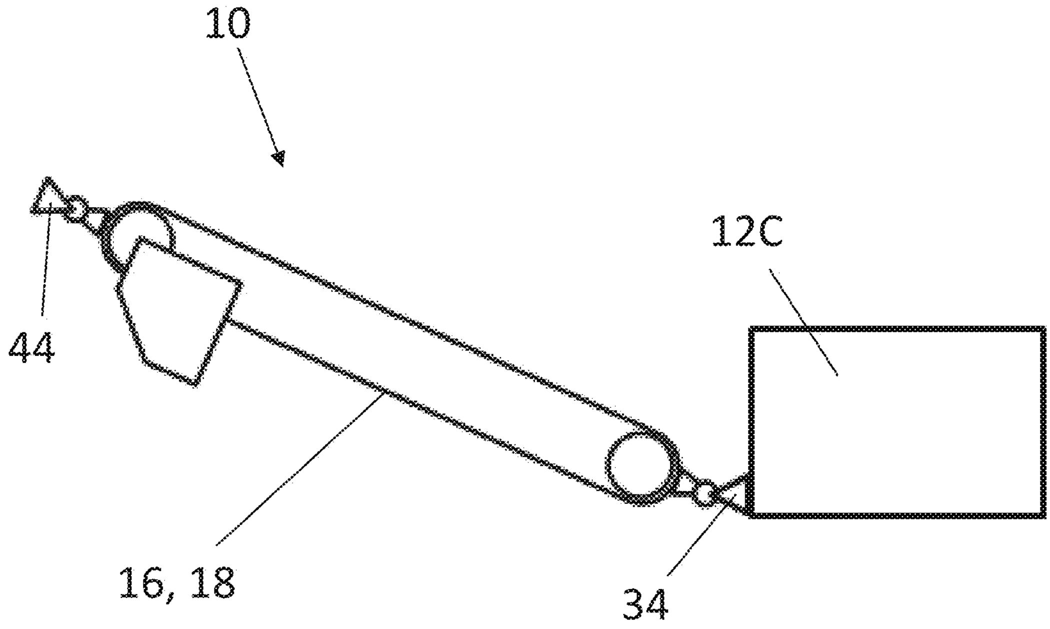
Figure 1I:
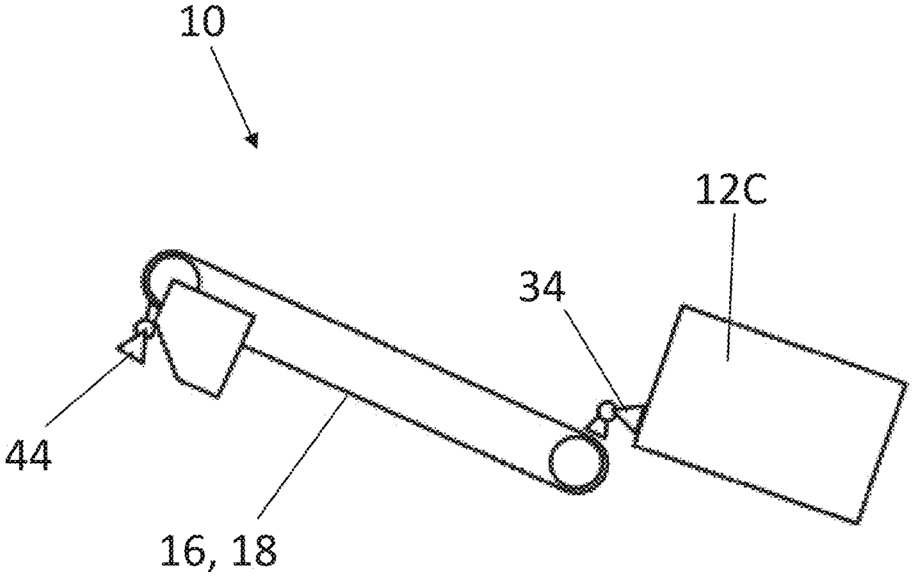

FIG. 1G to 1I show a further handling operation in which an object 12C is gripped which is arranged in a vertically lower position than the previously gripped object 12B. In order to grip the object 12C, the angle of inclination of the device 10 is changed by the handling apparatus such that the front end 28 of the continuous conveyor 16 is arranged in a vertically lower position than the rear end 30 of the continuous conveyor 16. The inclination of the continuous conveyor 16 prevents contact between the underside of the continuous conveyor 16 and a base (not shown) on which the object 12C is arranged. As can be seen from FIG. 1G, the inclination of the continuous conveyor 16 results in a surface of the object 12C to be gripped initially being at an angle to the holding plane of the gripping unit 34. In order to allow the gripping unit 34, in particular of the gripping element or elements, to rest flat against the object 12C, the first part 36 of the gripping unit 34 is pivoted relative to the second part 38 about the pivot axis in the running direction 26.

The invention claimed is:

1. A device for handling objects, including cardboard boxes, comprising a conveyor apparatus having at least one continuous conveyor with at least one circulating conveyor element which can be driven by a drive unit in at least one running direction, and a gripping apparatus having at least one gripping unit configured to grip at least one object and to arrange the at least one object gripped on the at least one continuous conveyor, including on the at least one circulating conveyor element, wherein the at least one gripping unit is forced coupled to the at least one circulating conveyor element so as to move along with the at least one circulating conveyor element in the at least one running direction; and the gripping apparatus comprises at least one further gripping unit, the at least one gripping unit and the at least one further gripping unit being arranged one behind the other in the at least one running direction;

wherein the at least one gripping unit comprises a first part and a second part, one or more gripping elements of the at least one gripping unit being arranged on the first part, the first part being coupled to the at least one circulating conveyor element by the second part, and the first part being mounted on the second part so as to be pivotable, including about a pivot axis that is perpendicular to the at least one running direction, the at least one gripping unit comprising a pivot joint configured to connect the first part and the second part.

2. The device according to claim 1, wherein the at least one continuous conveyor is configured as a belt conveyor, chain conveyor or circular conveyor.

3. The device according to claim 1, wherein the at least one gripping unit is configured as a suction gripper, clamping gripper, or adhesion gripper.

4. The device according to claim 1, wherein a free end of the at least one gripping unit, which is spaced apart from the at least one circulating conveyor element, is formed by the one or more gripping elements.

5. The device according to claim 1, wherein the at least one gripping unit is arranged in the center of the at least one continuous conveyor with respect to a transverse extension of the at least one continuous conveyor.

6. A handling system comprising the device according to claim 1 and a handling apparatus for handling the device.

7. The device according to claim 1, wherein the at least one continuous conveyor comprises at least one further circulating conveyor element, the at least one circulating conveyor element and the at least one further circulating conveyor element being arranged next to one another.

8. The device according to claim 1, wherein at least one imaging sensor unit is configured to detect objects to be gripped.

9. A method for handling objects by means of the device according to claim 1, comprising:

gripping at least one object, including a cardboard box, using the at least one gripping unit, driving the at least one circulating conveyor element in the at least one running direction by means of the drive unit, wherein the at least one gripping unit is also moved in the at least one running direction by forced coupling with the at least one circulating conveyor element and the at least one object gripped is arranged on the at least one continuous conveyor.

10. The method according to any of claim 9, wherein the first part is pivoted relative to the second part in order to grip the at least one object; and wherein the first part is pivoted relative to the second part before the at least one object is contacted by the at least one gripping unit.

11. The method according to claim 10, wherein the first part is pivoted relative to the second part after gripping the at least one object in order to arrange the at least one object gripped on the at least one continuous conveyor.

12. A method for handling objects by means of a device, including cardboard boxes, the device comprising:

a conveyor apparatus having at least one continuous conveyor with at least one circulating conveyor element which can be driven by a drive unit in at least one running direction, and a gripping apparatus having at least one gripping unit configured to grip at least one object and to arrange the at least one object gripped on the at least one continuous conveyor, including on the at least one circulating conveyor element, the at least one gripping unit being forced coupled to the at least one circulating conveyor element so as to move along with the at least one circulating conveyor element in the at least one running direction; and the gripping apparatus comprising at least one further gripping unit, the at least one gripping unit and the at least one further gripping unit being arranged one behind the other in the at least one running direction;

the at least one gripping unit comprising a first part and a second part, one or more gripping elements of the at least one gripping unit being arranged on the first part, the first part being coupled to the at least one circulating conveyor element by the second part, and the first part being mounted on the second part so as to be pivotable, including about a pivot axis that is perpendicular to the at least one running direction;

the method comprising:

gripping at least one object, including a cardboard box, using the at least one gripping unit; and driving the at least one circulating conveyor element in the at least one running direction by means of the drive unit, wherein the at least one gripping unit is also moved in the at least one running direction by forced coupling with the at least one circulating conveyor element and the at least one object gripped is arranged on the at least one continuous conveyor;

wherein the at least one gripping unit grips the at least one object in a vertically lower region of the at least one object with respect to a vertical extension of the at least one object.

13. The method according to claim 12, wherein the device further comprises the at least one continuous conveyor configured as a belt conveyor, chain conveyor or circular conveyor.

14. The method according to claim 12, wherein the device further comprises the at least one gripping unit configured as a suction gripper, clamping gripper, or adhesion gripper.

15. The method according to claim 12, wherein the device further comprises the at least one gripping unit being arranged in the center of the at least one continuous conveyor with respect to a transverse extension of the at least one continuous conveyor.

16. The method according to claim 12, wherein the device further comprises at least one imaging sensor unit configured to detect objects to be gripped.

17. The method for handling objects, including cardboard boxes, by means of a device comprising:

a conveyor apparatus having at least one continuous conveyor with at least one circulating conveyor element which can be driven by a drive unit in at least one running direction, and a gripping apparatus having at least c ne gripping unit configured to grip at least one object and to arrange the at least one object gripped on the at least one continuous conveyor, including on the at least one circulating conveyor element, wherein the at least one gripping unit being forced coupled to the at least one circulating conveyor element so as to move along with the at least one circulating conveyor element in the at least one running direction; and the gripping apparatus comprising at least one further gripping unit, the at least one gripping unit and the at least one further gripping unit being arranged one behind the other in the at least one running direction;

the at least one gripping unit comprising a first part and a second part, one or more gripping elements of the at least one gripping unit being arranged on the first part, the first part being coupled to the at least one circulating conveyor element by the second part, and the first part being mounted on the second part so as to be pivotable, including about a pivot axis that is perpendicular to the at least one running direction;

the method comprising:

gripping at least one object, including a cardboard box, using the at least one gripping unit; and driving the at least one circulating conveyor element in the at least one running direction by means of the drive unit, wherein the at least one gripping unit is also moved in the at least one running direction by forced coupling with the at least one circulating conveyor element and the at least one object gripped is arranged on the at least one continuous conveyor;

wherein an angle of inclination of the at least one continuous conveyor is changed in order to grip the at least one object.

18. The method according to claim 17, wherein the device further comprises the at least one continuous conveyor configured as a belt conveyor, chain conveyor or circular conveyor.

19. The method according to claim 17, wherein the device further comprises the at least one gripping unit configured as a suction gripper, clamping gripper, or adhesion gripper.

20. The method according to claim 17, wherein the device further comprises the at least one gripping unit being arranged in the center of the at least one continuous conveyor with respect to a transverse extension of the at least one continuous conveyor.

* * * * *